(No Model.)
W. T. ABBOTT.
STOCK CAR.
No. 259,071. Patented June 6, 1882.
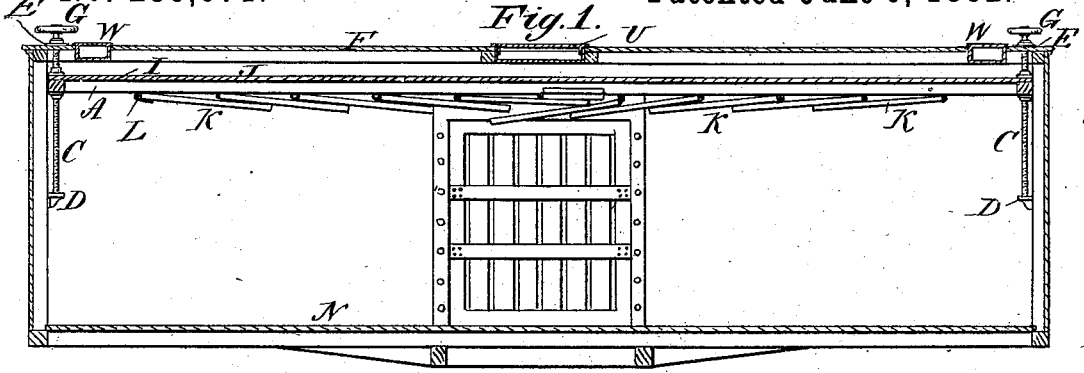
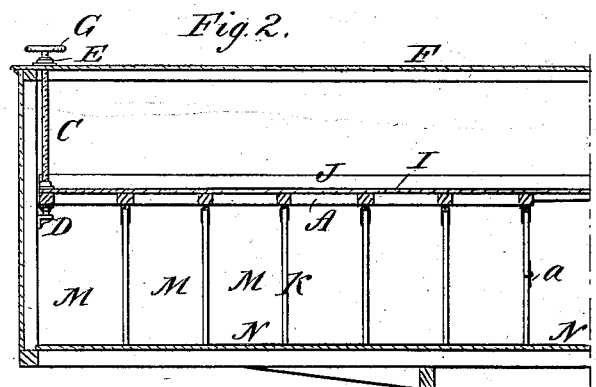
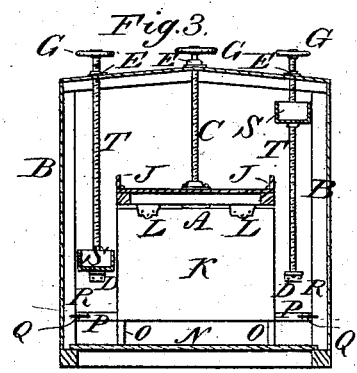
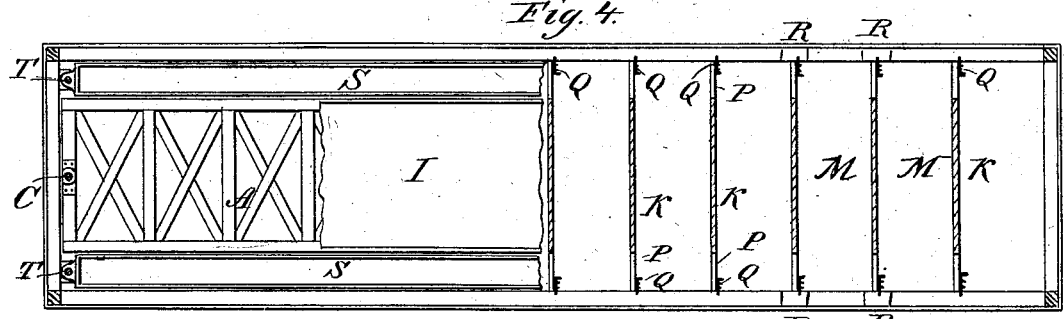
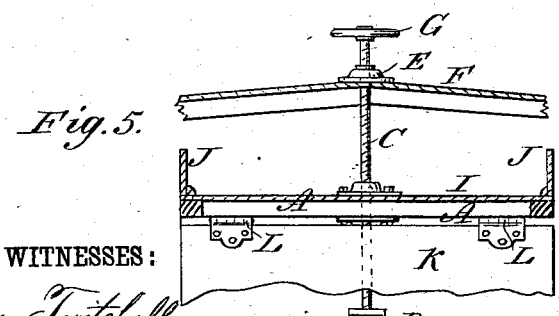
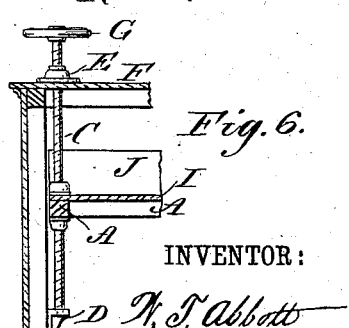
WITNESSES:
Dom Twitchell
C. Sedgwick
INVENTOR:
W. T. Abbott
BY Munn & Co
ATTORNEYS.

UNITED STATES PATENT OFFICE.

WILLIAM T. ABBOTT, OF FORT WAYNE, INDIANA.

STOCK-CAR.

SPECIFICATION forming part of Letters Patent No. 259,071, dated June 6, 1882.

Application filed April 13, 1882. (No model.)

*To all whom it may concern:*

Be it known that I, WILLIAM T. ABBOTT, of Fort Wayne, in the county of Allen and State of Indiana, have invented a new and Improved Cattle-Car, of which the following is a full, clear, and exact description.

This improvement in cattle-cars consists of doors or partitions hinged to a vertically-adjustable frame arranged in the upper part of the car, with screws for raising and lowering the frame, whereby the cattle may be separated from each other in stalls, when loaded in the car, by unfastening the partitions and letting them hang down between the animals, and a space for the storage of food for the cattle above the frame is provided by letting the platform down by the screws. Feed-troughs are also provided and suspended by screws to be let down for the use of the cattle, and, together with the partitions and frame, to be raised up to the roof of the car, out of the way, when cattle are not to be carried, to utilize the car for other freight, as hereinafter described.

Reference is to be had to the accompanying drawings, forming part of this specification, in which similar letters of reference indicate corresponding parts in all the figures.

Figure 1 is a longitudinal sectional elevation of a car constructed according to my invention, showing the frame and partitions adjusted in the top of the car preparatory to loading with cattle or other freight. Fig. 2 is a longitudinal sectional elevation of part of the car, showing the frame and partitions in the positions they occupy when the car is loaded with cattle. Fig. 3 is a transverse section of Fig. 2. Fig. 4 is a horizontal section of the car, showing a plan of the partition-supporting frame in one part and plan of the stalls in another part. Fig. 5 is a detail of the adjustable frame in transverse section, and Fig. 6 is a detail of the said frame in longitudinal section.

A represents a substantial frame, not quite as wide as the interior space between the sides B of the car, but extending the whole length of the car and suspended on screws C, which have substantial support on steps D, also in bearings E on the roof F, and are provided with a hand-wheel, G, on the top for turning them to raise and lower the frame. The frame is covered with sheathings or flooring I, and it has narrow sides J, rising above the top a short distance.

K represents the doors or partitions hinged to the under side of the frame A, transversely of the car and at suitable intervals along the car for partitioning it into stalls M for the cattle, said partitions being a little higher than the cattle, so that the legs O of the partitions will reach the floor N of the car when the frame A stands as low down above the cattle as the necessary space for them will allow. The partitions are equal in length to the width of the frame A, but are provided with arms P a short distance above the floor N, extending to the sides of the car, and having slide-bolts Q, to fasten in the stanchions R of the car-body.

S represents troughs for feeding and watering the cattle, suspended between the ends of the partitions and the sides of the car-body by screws T, so as to be let down within the reach of the cattle for supplying them while on the road.

U represents a door in the roof of the car to afford access to the space over the frame for handling the food and water.

In practice the roof and sides of the car will be tightly ceiled over and along the space wherein the hay is to be carried, to prevent the entry of sparks from the locomotive. The partitions will be fastened up under the frame A, as represented in Fig. 1, by any suitable means, and the middle partition will preferably have a joint at *a* to enable it to be folded over on itself, so that the rest of the partitions each way from it may be folded toward the center to facilitate letting them down after the animals have entered the stalls.

In loading the car the animals will enter individually in succession, and as each one enters his stall the partition will be let down. The same order will be followed in discharging the animals.

Two troughs are employed with filler-openings W in the roof of the car, in order that the cattle may be watered from either side of the car, according as they may stand with their heads fronting to one side or the other.

The partitions may be employed in connection with the adjustable frame without being hinged to it, the car being high enough and the said partitions being short enough for the cattle to pass under them.

Having thus fully described my invention, I claim as new and desire to secure by Letters Patent—

1. The combination, with a freight-car, of the vertically-adjustable frame A and partitions K, attached to the under side of said frame, substantially as described.

2. A series of doors or partitions, K, hinged to the under side of a frame, A, at intervals along the same within a freight-car, and said frame being vertically adjustable, substantially as specified.

3. The combination, with a freight-car, of vertically-adjustable frame A and partitions K, hinged to said frame, said partitions having arms P and fastening-bolts Q, to secure said partitions to the sides of the car, substantially as specified.

4. The combination, with a freight-car, of vertically-adjustable frame A, partitions K, hinged to said frame, and vertically-adjustable troughs S, the arrangement being such that the troughs may be let down between the partitions and the sides of the car, substantially as specified.

5. The combination, with a freight-car, of a vertically-adjustable frame, A, having partitions K suspended from the under side, and having a floor or cover, I, and sides J, substantially as specified.

6. In a series of partitions, K, hinged to the under side of a frame, A, in the upper part of a cattle-car, one of said partitions having a hinge, a, to fold on itself, to allow the rest to fold over it from each way, substantially as specified.

WILLIAM T. ABBOTT.

Witnesses:
MARY E. ROWAN,
F. W. KUHNE.